Aug. 21, 1956 A. JACOBS 2,759,437
FOOD PROCESSING MACHINE AND METHOD
Filed May 19, 1953 3 Sheets-Sheet 1
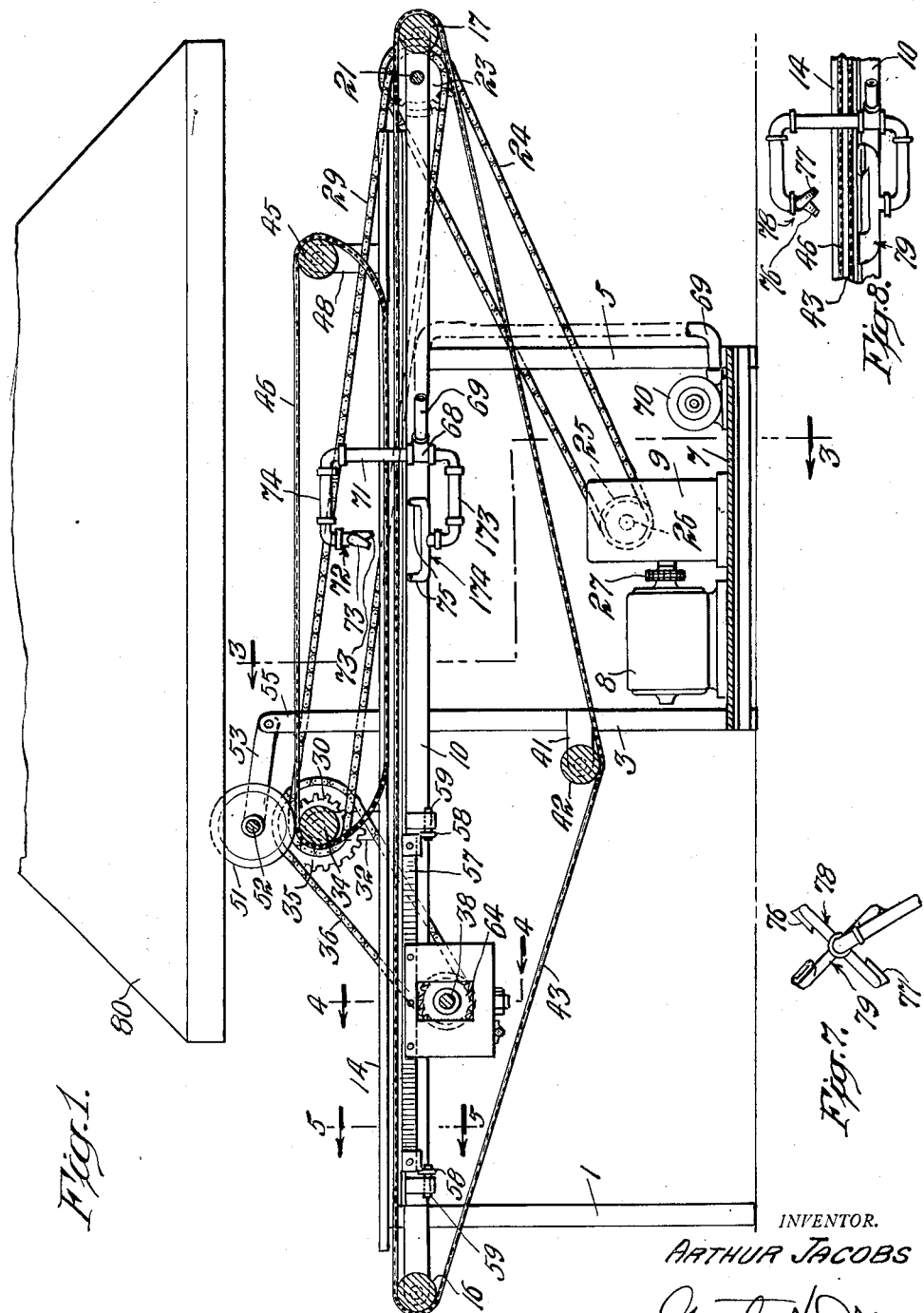
INVENTOR.
ARTHUR JACOBS
BY
his ATTORNEY

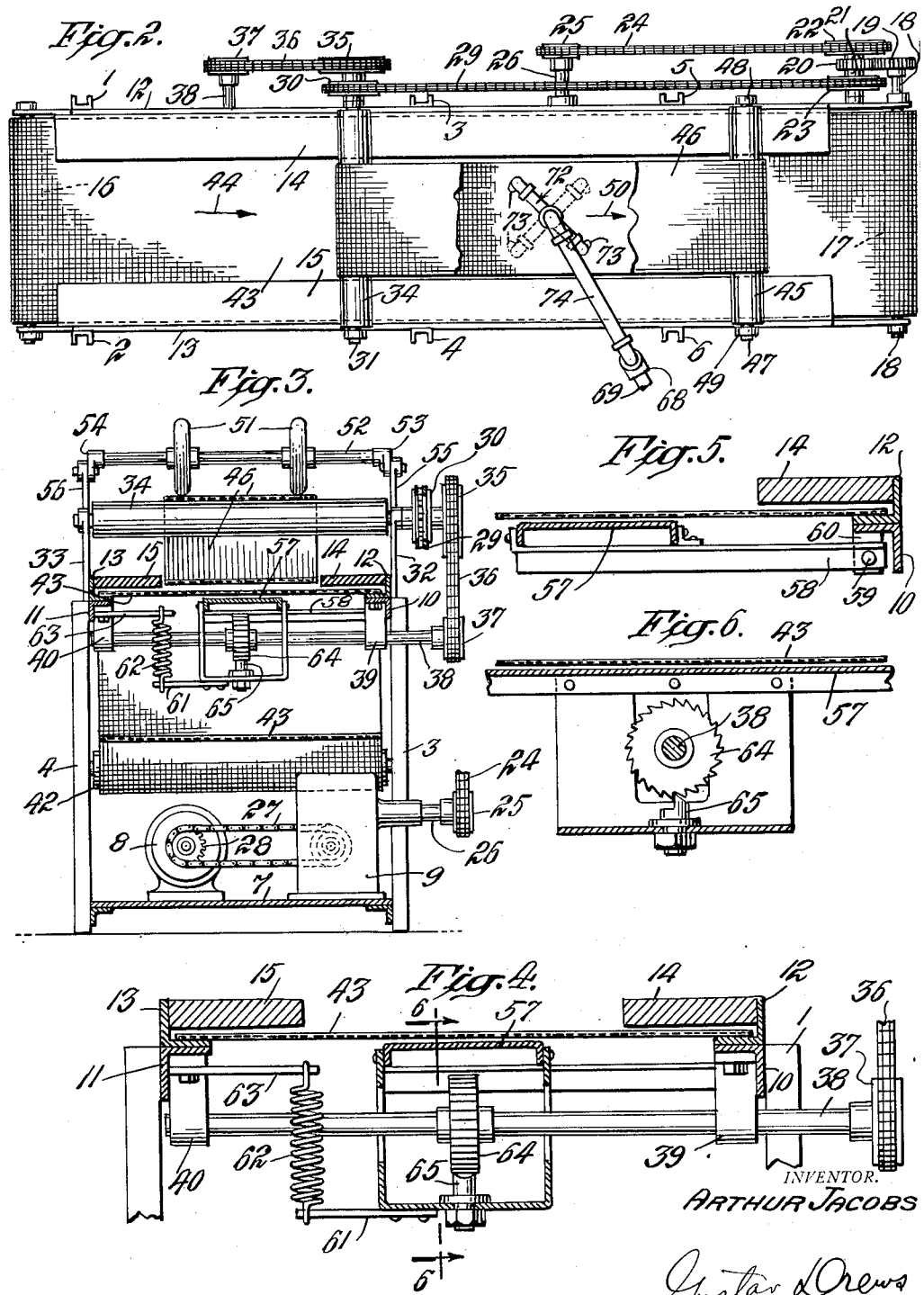

Aug. 21, 1956  A. JACOBS  2,759,437
FOOD PROCESSING MACHINE AND METHOD
Filed May 19, 1953  3 Sheets-Sheet 3
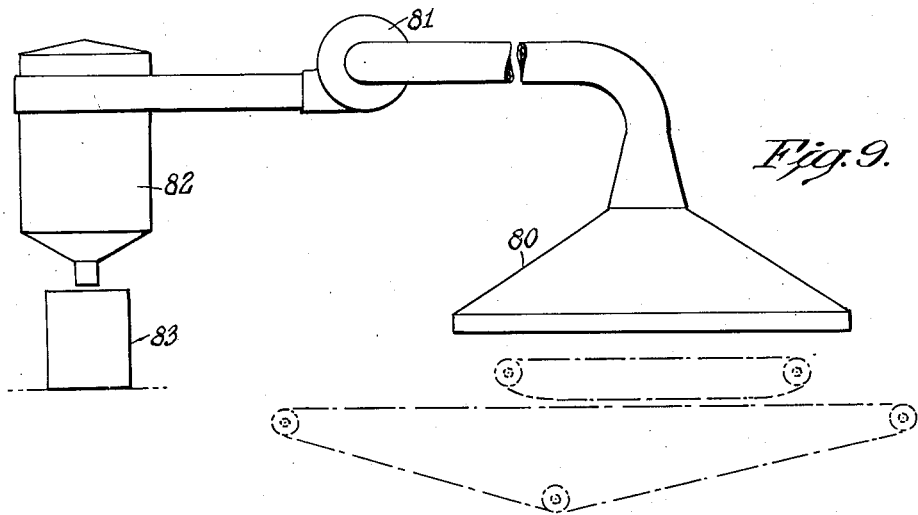
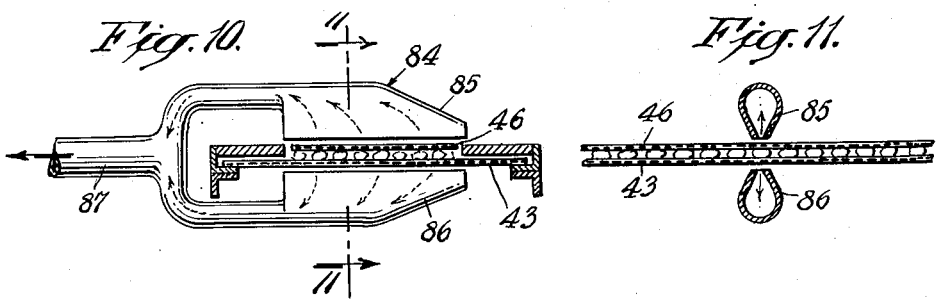
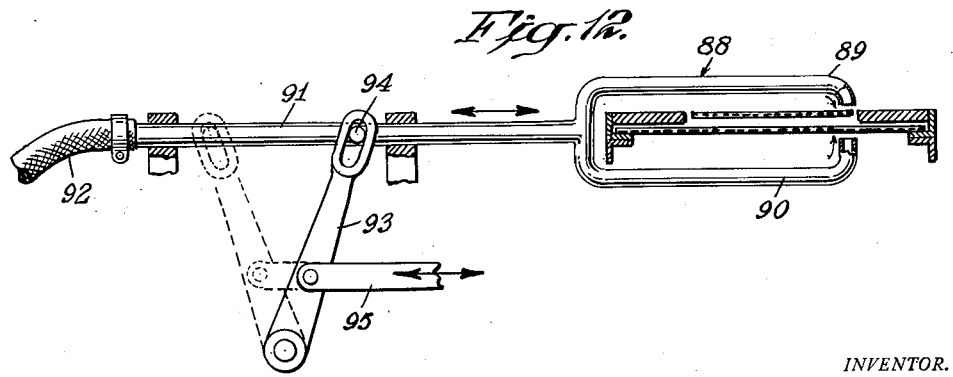
INVENTOR.
ARTHUR JACOBS
BY *Gustav Drews*
his ATTORNEY

United States Patent Office 2,759,437
Patented Aug. 21, 1956

2,759,437

FOOD PROCESSING MACHINE AND METHOD

Arthur Jacobs, New Hyde Park, N. Y., assignor to Mason, Au & Magenheimer Conf. Mfg. Co., Mineola, N. Y., a corporation of New York Application May 19, 1953, Serial No. 356,013

6 Claims. (Cl. 107—44)

This invention relates to food processing machines in general and more especially to the process and machines for removing finely comminuted particles, such as starch or the like, from food items, such as candies.

In the processing of food items it becomes desirable from time to time according to the processes used to remove deposits of finely comminuted particles, such as starch particles or the like, from the food items. As an instance, in the manufacture of candies such as creams, gum drops and the like, starch mold boards are extensively used having a layer of milled dry starch of a predetermined depth into which layer a design master having predetermined conformations are depressed to form the mold pockets to receive the candy mixture in fluid form. The candy mixture before being introduced into the mold pockets is generally prepared by heat and converted into a liquid mass. After the liquid candy mixture so prepared is poured into the mold pockets, it is allowed to cool and solidify. Although milled dry starch is in part selected because of its inertness to the average candy mixtures used, nevertheless, due in part to the sticky nature of the candy mixture when poured into the mold pockets, and also to the relatively light weight of the starch particles, the candy units after solidification will have a starch coating or deposit thereon especially in crevices and the like appearing in the surfaces of the candy units. Many attempts with moderate success have been made to remove this starch contamination.

With the foregoing in mind, the present invention aims to provide an improved method and apparatus for carrying out such method characterized by a relatively continuous process for transporting food items bearing starch deposits to and from a pneumatic cleaning device.

Since due in part to the low specific gravity and fineness of the starch particles, brushes and agitators have been only moderately effective in removing the same, it is an object of the present invention to use pneumatic means either through pressure or suction to bathe the entire surfaces of the food items with an atmospheric reaction to liberate and in turn effectively remove the starch particles from the food items being treated.

These and other features, capabilities and advantages of the present invention will appear from the subjoined detailed description of specific embodiments thereof illustrated in the accompanying drawings, in which:

Fig. 1 is a side elevation partly in section of one embodiment.

Fig. 2 is a plan view of the same partly broken away.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a section on the line 6—6 of Fig. 4.

Fig. 7 is a plan view of a second embodiment.

Fig. 8 is a side elevation of the embodiment illustrated in Fig. 7.

Fig. 9 illustrates more or less diagrammatically the mechanism for receiving the liberated starch particles and reclaiming them for future use.

Fig. 10 is a fragmental detail partly in section of a third embodiment.

Fig. 11 is a section on the line 11—11 of Fig. 10.

Fig. 12 is a fragmental detail partly in section of a fourth embodiment.

In the embodiment shown in Figs. 1 to 6, inclusive, there is provided a main frame including six standards 1, 2, 3, 4, 5 and 6, the standards having connected thereto at their lower ends the platform 7 on which rests the motor 8 and the gear housing 9. The upper ends of the uprights 1, 3 and 5 are connected to one another by the angle irons 10 and the upper ends of the uprights 2, 4 and 6 by the angle irons 11. On the inwardly extending flanges of the angle irons 10 and 11 there are secured the inwardly extending flanges of the angle irons 12 and 13, respectively. To the upwardly extending flanges of the angle irons 12 and 13 there are secured the inwardly extending belt guides 14 and 15, respectively, the inner opposing edges of which are spaced from one another. The lower angle irons 10 and 11 extend outwardly of the standards 1, 2 and 5, 6. The outer ends of the angle irons 10 and 11 extend beyond the standards 1 and 2 having journalled therein the shaft ends of the roller 16, and the outer ends of the angle irons 10 and 11 extend beyond the standards 5 and 6 having journalled therein the shaft ends of the roller 17, one of which ends 18 having fixed thereon the gear 19 in mesh with the gear 20 mounted on the shaft 21 also journalled in the angle irons 10 and 11 inwardly of the roller 17 between the roller 17 and the uprights 5 and 6. On the shaft 21 there are fixed two sprocket wheels 22 and 23, the sprocket wheel 22 being connected by the sprocket chain 24 to the sprocket wheel 25 on the shaft 26 of the gear housing 9, which shaft 26 is operatively connected by means of a transmission mounted in said housing 9 to the sprocket chain 27 which is connected to the sprocket wheel 28 of the drive shaft of the motor 8.

The sprocket wheel 23 in turn is connected by the sprocket chain 29 to the sprocket wheel 30 fixed on the shaft 31 journalled in the standards 32 and 33 extending upwardly from the side rails 12 and 13. On the shaft 31 there is fixed the roller 34. On the same shaft 31 there is also fixed the sprocket wheel 35 which is connected by the sprocket chain 36 to the sprocket wheel 37 mounted on the shaft 38 journalled in the bearings 39 and 40 secured to the side rails 10 and 11, respectively. Extending rearwardly of the standards 3 and 4, that is, toward the standards 1 and 2, there are secured the extensions 41 in the outer ends of which there are journalled the shaft ends of the roller 42.

Around the rollers 16, 17 and 42 there extends the endless conveyor 43 preferably composed of wire mesh, the width of which in the present instance extends the full width of the rollers 16, 17 and 42 between the uprights 1, 3 and 5 on one side, and the uprights 2, 4 and 6 on the other side, the upper portion of the conveyor 43 between the rollers 16 and 17 being actuated in the direction of the arrow 44 by means of the driven shaft 18 connected by the gears 19 and 20 to the sprocket wheel 22 which in turn by means of the sprocket chain 24 connected to the sprocket wheel 25 on the shaft 26 is operatively connected by the transmission in the housing 9 to the sprocket chain 27 drivingly connected to the gear 28 of the motor 8.

Around the rollers 34 and 45 in turn there extends the endless conveyor or retainer 46 similarly composed of wire mesh which however is narrower than the conveyor 43 extending between the inner opposing edges of the guides 14 and 15. The roller 45 is mounted on the shaft 47 journalled in the upper ends of the uprights 48 and 49, respectively secured to the angle irons 12 and 13, respectively. The lower portion of the conveyor 46 is allowed to drape onto the upper portion of the conveyor 43 and will be actuated, see Fig. 2, in the direction of the arrow 50 due to the driving connection provided by the sprocket wheel 30 on the shaft 31 which is drivingly connected to the sprocket wheel 23 by the sprocket chain 29, which sprocket wheel 23 is in turn mounted on the shaft 21 on which there is mounted the gear 20 in mesh with the gear 19.

In order to retain the slack in the conveyor 46 and yet maintain it in driving engagement with the driven roller 34, the weighted idlers 51 are mounted on the shaft 52 journalled in the front ends of the arms 53 and 54 pivotally connected at their rear ends to the uprights 55 and 56, respectively, secured to and extending upwardly from the angle irons 12 and 13, respectively.

The food items to be treated by the present machine are initially deposited on the left hand end of the conveyor 43 and conveyed by it between the guides 14 and 15 into engagement with the lower portion of the conveyor 46 to anchor or secure the food items against displacement while subjected to the pneumatic treatment hereinafter to be described.

In order satisfactorily to spread out the food items into a single layer onto the conveyor 43 before being captured by the conveyor 46, agitation of the conveyor 43 is effected. In order to bring about this agitation in the present instance, an elongated shoe or plate 57 extends between the opposing edges of the guides 14 and 15, see Fig. 1, from a point just forwardly of the uprights 1 and 2 to a point just rearwardly of the uprights 32 and 33. This shoe 57 is mounted on the arms 58 pivoted at 59 in the bearings 60 extending down from the side rail 10. The shoe 57 is secured to the frame 60 through which extends the shaft 38. This frame 60 in turn is provided with an arm 61 connected by the spring 62 to the arm 63 secured to the angle iron 11, Fig. 4. The shaft 38 has fixed thereon the toothed wheel 64 in engagement with the pin or abutment 65 secured to the frame 60. Consequently as the shaft 38 is rotated by the sprocket wheel 37, the toothed wheel 64 in turn will be rotated and the pin 65 intermittently depressed against the tension of the spring 62, in turn to cause the frame 60 to be agitated and the shoe 57 mounted on the frame 60 and in substantial engagement with the conveyor 43 to agitate the conveyor 43. After the food items have been effectively spread out by this actuation, they will be captured by the belt 46 and advanced into proximity to the pneumatic means now to be described. The pneumatic means may be characterized by a device for manipulating air under a greater pressure than that of the atmosphere or air under a lower pressure than that of the atmosphere. In the present embodiment, that shown in Figs. 1 to 6, air under pressure of approximately sixty pounds to the square inch may be directed at the upper and lower faces of the food items captured between the conveyors 43 and 46 preferably while in a whirling state. This action is achieved in the present instance by rotary air discharging units connected to the tubular T 68 which is connected to the conduit 69 connected to a suitable source of air under pressure, such as the pump 70. The T 68 will be secured in place, preferably adjacent the side rail 13 and has in the present instance an L-formed conduit 71 extending upwardly from the T 68 to the free end of which there is pivotally connected the two-armed tubular unit 72 having depending discharge nozzles 73 at the ends thereof offset at about 10° to the substantially vertical axis of rotation of the unit 72. The T 68 is also provided with a second tubular arm 173 extending substantially parallel to the limb 74 of the conduit 71, at the free end of which arm 173 there is rotatably mounted the two-armed tubular unit 174 having the upwardly directed discharge nozzles 75 at the ends thereof similarly offset at about 10° to the substantially vertical axis of rotation of the unit 174. Preferably also as shown in Fig. 2, the offset of the nozzles 73 and 75 will be in opposite directions to effect rotation of the units 72 and 174 in opposite directions to one another to effect the turbulence of the air under pressure directed at the food items not only in a whirl, but in an agitated whirl, so desirable effectively to remove the finely comminuted particles from the food items.

The units 72 and 174 when in operation will be positioned directly above and below the path of movement of the lower portion of the conveyor 46 and the upper portion of the conveyor 43, respectively, as shown in Fig. 1.

When rarefied air or suction is used, the pump 70, if reversible, may be reversed to effect a suction, and instead of the units 72 and 174, suction shoes typical of vacuum air cleaner nozzles such as disclosed in Fig. 7 may be used with the exception that the nozzle portions 76 and 77 will again be offset about 10° relative to the substantially vertical axis of rotation of the unit 78 so that at the same time that the fine particles are subjected to air under reduced pressure approximating fourteen and one-half pounds to the square inch, this air will also be caused to whirl. In turn, to aggravate the turbulence so produced, here too the upper and lower units 78 and 79 will have their nozzles point in opposite directions to cause the nozzles to rotate in opposite directions to one another.

Above the machine, preferably there is provided a hood 80 or the like which in turn is provided with other suction means to draw up the dust particles or starch released from the food items. In Fig. 9 a suction pump 81 is illustrated as associated with the hood 80 to draw up the liberated dust particles, such as starch, and advance them to the conventional separator 82 where the reclaimed starch will be received by a suitable receptacle, such as the receptacle 83.

In the embodiment shown in Figs. 10 and 11 in place of the rotating suction nozzles of the embodiment illustrated in Figs. 6 and 7, a stationary nozzle unit 84 is provided which has two nozzles 85 and 86 extending the full width of the upper conveyor 46, which two nozzles 85 and 86 are connected to a common conduit 87 connected to the suction pump, not shown.

In the embodiment shown in Fig. 12, in turn, there is provided another form of air pressure transmitting means consisting of a nozzle unit 88 which has two air discharging nozzles 89 and 90 connected to the common rigid conduit 91 which is connected by a suitable flexible conduit 92 to a suitable source of air pressure, such as the pump 70. In this embodiment, the nozzles 89 and 90 instead of rotating above and below the conveyors 46 and 43, respectively, they are reciprocated transversely across the conveyors 46 and 43 by any suitable actuating means, such as the lever 93, having a loop to receive the pin 94 on the conduit 91, which in turn is connected to a suitably actuated pitman 95 or the like.

It is obvious that various changes and modifications may be made to the details of construction without departing from the general spirit of the invention as set forth in the appended claims.

I claim:

1. The process of removing finely comminuted particles such as starch from food items such as candies consisting in capturing and transporting the food items to be treated, bodily agitating and spreading the food items to be treated while being transported, and directing a whirling stream of air under pressure upon the immediate upper and lower sides of the food items being transported.

2. The process of removing finely comminuted particles such as starch from food items such as candies consisting in capturing and transporting the food items to be treated, bodily agitating and spreading the food items to be treated while being transported, and directing two blasts of air under pressure whirling in opposite directions to one another, one blast against the upper and the other blast against the lower faces of the food items being transported.

3. The combination of a main wire mesh endless conveyor having a supporting portion thereof travelling through a substantially horizontal path of movement for receiving food items on its outer surface and thereupn transporting the same, a device including an endless wire mesh retainer operatively disposed above said conveyor and having a portion thereof travelling adjacent to said supporting portion for capturing the food items received between said retainer and said conveyor and anchoring the food items against accidental displacement while being transported, means for driving said conveyor and said retainer in opposite directions to enable the portions adjacent one another to travel in substantially the same direction, an agitator for bodily agitating said conveyor to spread the food items on said conveyor before they are transported by said conveyor to said device, and air blowers including rotating air-discharging nozzles disposed directly opposite one another, one adjacent the inner face of the portion of said retainer travelling adjacent to the supporting portion of said conveyor and the other below the supporting portion of said conveyor.

4. The combination as set forth in claim 3 in which said device for capturing the food items while being transported includes guides along the sides of said conveyor and the portion of the retainer directly above said supporting portion is draped into engagement with the food items so transported and moving said supporting portion.

5. The combination as set forth in claim 3 in which the deposits of fine particles consist of starch, a hood is disposed above said retainer and air blowers, and a suction device is operatively connected to said hood to capture the liberated starch and remove it.

6. The combination as set forth in claim 3 in which the nozzles rotate in oppoiste directions to one another to effect an agitated whirl of the air surrounding the food items.

References Cited in the file of this patent

UNITED STATES PATENTS

| 687,542 | Paehlke | Nov. 26, 1901 |
| 769,445 | Meurell | Sept. 6, 1904 |
| 809,182 | Haase | Jan. 2, 1906 |
| 1,141,861 | Bausman | June 1, 1915 |
| 1,405,067 | Nuss et al. | Jan. 31, 1922 |
| 1,694,590 | Gopel | Dec. 11, 1928 |
| 1,872,284 | Harrigan | Aug. 16, 1932 |
| 2,629,343 | Rose | Feb. 24, 1953 |
| 2,631,550 | Rhodes | Mar. 17, 1953 |

FOREIGN PATENTS

| 5,696 | Great Britain | Mar. 16, 1899 |
| 455,910 | Germany | Feb. 11, 1928 |